US010061561B2

(12) United States Patent
Lutz

(10) Patent No.: US 10,061,561 B2
(45) Date of Patent: Aug. 28, 2018

(54) FLOATING POINT ADDITION WITH EARLY SHIFTING

(71) Applicant: ARM Limited, Cambridge (GB)

(72) Inventor: David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 45 days.

(21) Appl. No.: 15/258,051

(22) Filed: Sep. 7, 2016

(65) Prior Publication Data

US 2018/0067721 A1 Mar. 8, 2018

(51) Int. Cl.
*G06F 7/485* (2006.01)
*G06F 5/01* (2006.01)

(52) U.S. Cl.
CPC ............... *G06F 7/485* (2013.01); *G06F 5/01* (2013.01); *G06F 2205/00* (2013.01); *G06F 2207/483* (2013.01)

(58) Field of Classification Search
None
See application file for complete search history.

(56) References Cited

U.S. PATENT DOCUMENTS

| 9,483,232 | B2* | 11/2016 | Lutz ..................... G06F 5/012 |
| 2007/0061391 | A1* | 3/2007 | Tan ..................... G06F 7/49936 708/495 |
| 2012/0215823 | A1* | 8/2012 | Lutz ..................... G06F 7/485 708/209 |
| 2016/0248439 | A1* | 8/2016 | Tanaka ..................... H03M 7/24 |
| 2017/0090869 | A1* | 3/2017 | Lutz ..................... G06F 7/4876 |
| 2018/0067721 | A1* | 3/2018 | Lutz ..................... G06F 7/485 |

* cited by examiner

*Primary Examiner* — David H Malzahn

(74) *Attorney, Agent, or Firm* — Nixon & Vanderhye P.C.

(57) ABSTRACT

A floating point adder includes leading zero anticipation circuitry to determine a number of leading zeros within a result significand value of a sum of a first floating point operand and a second floating point operand. This number of leading zeros is used to generate a mask which in turn selects input bits from a non-normalized significand produced by adding the first significand value and the second significand value. The non-normalized significand is then normalized at the same time as the output rounding bits used to round the normalized significand value are generated by rounding bit generation circuitry.

12 Claims, 3 Drawing Sheets

FLOATING POINT ADDITION WITH EARLY SHIFTING

BACKGROUND

Field

Figure 1:
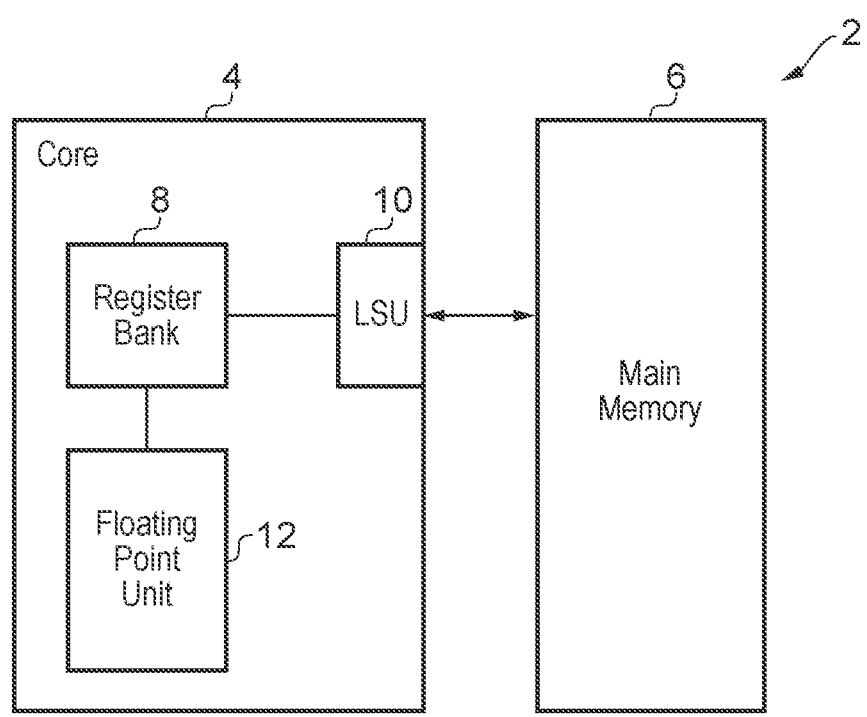

This disclosure relates to the field of data processing systems. More particularly, this disclosure relates to data processing systems for performing floating point addition and using leading zero anticipation to determine a number of leading zeros within a result significand value.

Description

It is known to provide data processing systems which support floating point addition. A floating point value is formed of an exponent value and a fraction value. The fraction value together with an implied leading "1" corresponds to a significand value. Leading zero anticipation circuitry may be used after addition of a first significand value to a second significand value as part of generating a shift value to normalize the result significand value.

SUMMARY

At least some embodiments of the present disclosure provide apparatus for processing data comprising:

a first input to receive a first floating point operand having a first significand value;

a second input to receive a second floating point operand having a second significand value;

leading zero anticipation circuitry to determine a number of leading zeros within a result significand value of a sum of said first floating point operand and said second floating point operand;

mask generation circuitry to generate, in dependence upon said number of leading zeros, one or more masks to be used to control rounding of said result significand value;

an adder to add said first significand value and said second significand value to generate a non-normalized significand value;

rounding input bit selection circuitry to select, in dependence upon said one or more masks, one or more rounding input bits within said non-normalized significand value;

a normalization shifter to shift said non-normalized significand value by a normalizing shift amount to form a normalized significand value; and rounding bit generation circuitry to generate, in dependence upon said one or more rounding input bits, one or more output rounding bits to be applied to round said normalized significand value to form said result significand value.

At least some embodiments of the present disclosure provide apparatus for processing data comprising:

first input means for receiving a first floating point operand having a first significand value;

second input means for receiving a second floating point operand having a second significand value;

leading zero anticipation means for determining a number of leading zeros within a result significand value of a sum of said first floating point operand and said second floating point operand;

mask generation means for generating, in dependence upon said number of leading zeros, one or more masks to be used to control rounding of said result significand value;

adder means for adding said first significand value and said second significand value to generate a non-normalized significand value;

rounding input bit selection means for selecting, in dependence upon said one or more masks, one or more rounding input bits within said non-normalized significand value;

normalization shifting means for shifting said non-normalized significand value by a normalizing shift amount to form a normalized significand value; and rounding bit generation means for generating, in dependence upon said one or more rounding input bits, one or more output rounding bits to be applied to round said normalized significand value to form said result significand value.

At least some embodiments of the present disclosure provide a method of processing data comprising:

receiving a first floating point operand having a first significand value;

receiving a second floating point operand having a second significand value;

determining a number of leading zeros within a result significand value of a sum of said first floating point operand and said second floating point operand;

generating, in dependence upon said number of leading zeros, one or more masks to be used to control rounding of said result significand value;

adding said first significand value and said second significand value to generate a non-normalized significand value;

selecting, in dependence upon said one or more masks, one or more rounding input bits within said non-normalized significand value;

shifting said non-normalized significand value by a normalizing shift amount to form a normalized significand value; and generating, in dependence upon said one or more rounding input bits, one or more output rounding bits to be applied to round said normalized significand value to form said result significand value.

The above, and other objects, features and advantages of this disclosure will be apparent from the following detailed description of illustrative embodiments which is to be read in connection with the accompanying drawings.

DRAWINGS

Figure 2:
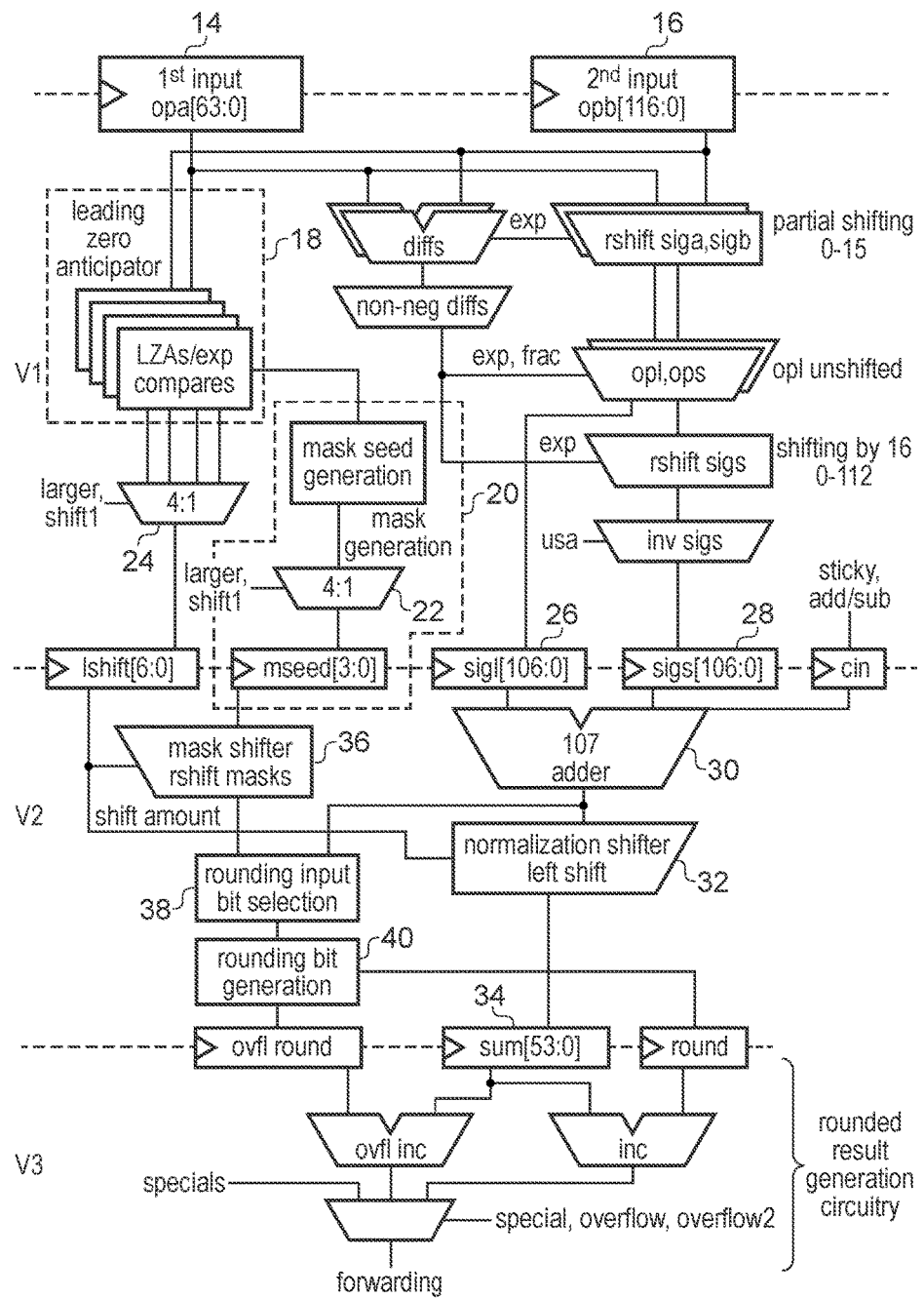
Figure 3:
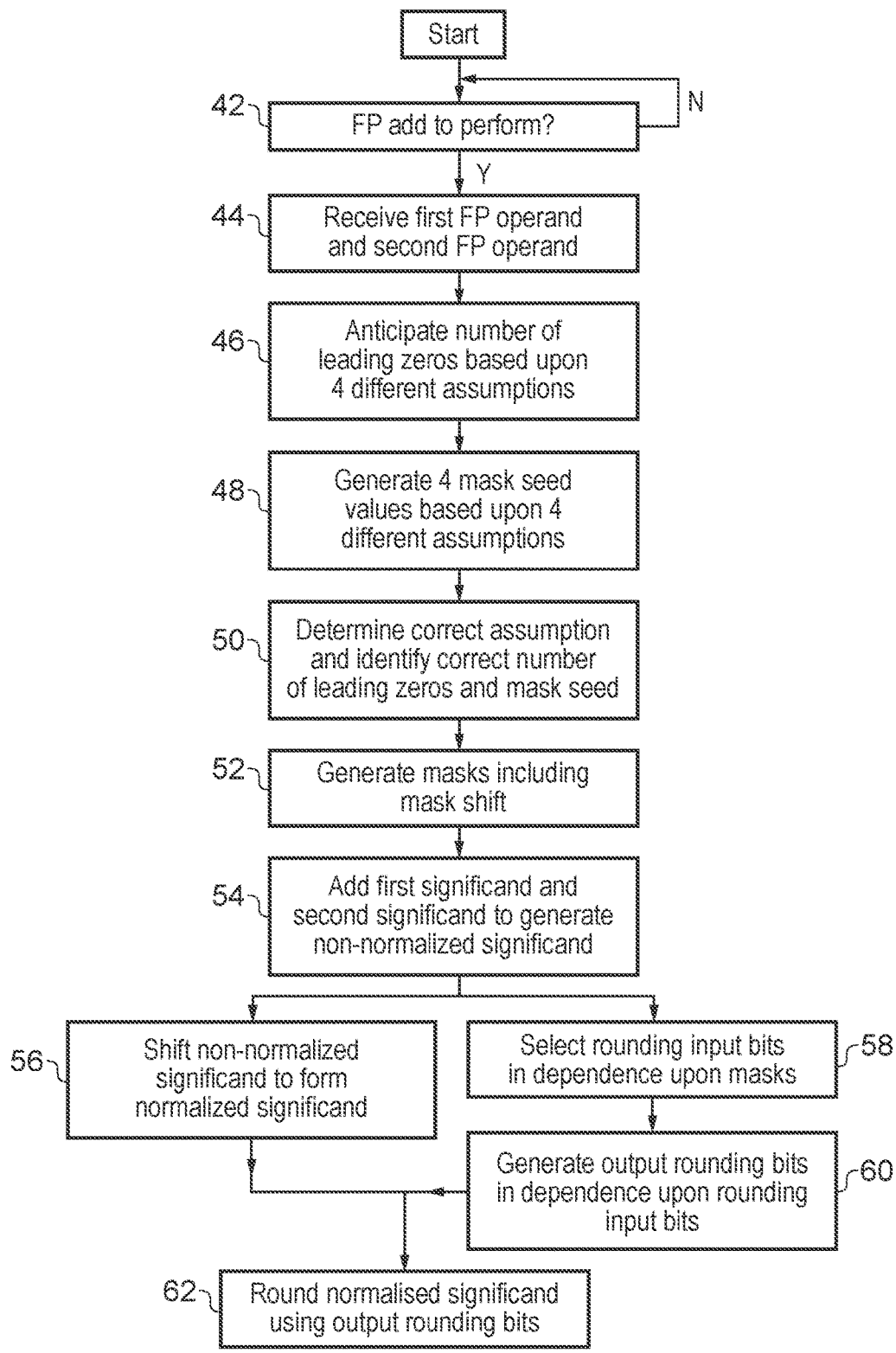

FIG. 1 schematically illustrates the data processing system supporting floating point arithmetic operations;

FIG. 2 schematically illustrates a portion of a floating point addition data path for adding first and second significand values to generate a result significand value; and FIG. 3 is a flow diagram schematically illustrating the operation of the circuitry of FIG. 2.

EMBODIMENTS

Floating-point (FP) is a useful way of approximating real numbers using a small number of bits. The IEEE 754-2008 FP standard proposes multiple different formats for FP numbers, but the ones that ARM is concerned with are binary 64 (also known as double precision, or DP), binary 32 (also known as single precision, or SP), and binary 16 (also known as half precision, or HP). The numbers 64, 32, and 16 refer to the number of bits required for each format.

Representation

FP numbers are quite similar to the "scientific notation" taught in science classes, where instead of negative two million we'd write $-2.0\times10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers all consist of a sign bit, some number of biased exponent bits, and some number of fraction bits. In particular, the formats we are interested in consist of the following bits:

| format | sign | exponent | fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value:

$$-1^{sign}\times1.\text{fraction}\times2^e$$

where e is the true exponent computed from the biased exponent. The term 1.fraction is called the significand, and the 1 is not stored as part of the FP number, but is instead inferred from the exponent. All exponents except zero and the maximum exponent indicate a significand of the form 1.fraction. The exponent zero indicates a significand of the form 0.fraction, and a true exponent that is equal to 1-bias for the given format. Such a number is called subnormal (historically these numbers were referred to as denormal, but modern usage prefers the term subnormal).

Numbers with both exponent and fraction equal to zero are zeros.

The following table has some example numbers in HP format. The entries are in binary, with '_' characters added to increase readability. Notice that the subnormal entry (4th line of the table, with zero exponent) produces a different significand than the normal entry in the preceding line.

| sign | 5-bit exponent | 10-bit fraction | 11-bit significand | value |
|---|---|---|---|---|
| 0 | 01111 | 00_0000_0000 | 100_0000_0000 | $1.0 \times 2^0$ |
| 1 | 01110 | 10_0000_0000 | 110_0000_0000 | $-1.1 \times 2^{-1}$ |
| 0 | 00001 | 10_0000_0000 | 110_0000_0000 | $1.1 \times 2^{-14}$ |
| 0 | 00000 | 10_0000_0000 | 010_0000_0000 | $0.1 \times 2^{-14}$ |
| 1 | 11111 | 00_0000_0000 | | -infinity |
| 0 | 11111 | 00_1111_0011 | | NaN |

A large part of the complexity of FP implementation is due to subnormals, therefore they are often handled by microcode or software. All recent ARM parts (anything with Cortex in the name) handle subnormals in hardware, speeding up these operations by a factor of 10 to 100 compared to a software or microcode implementation.

Integers, Fixed-Point, Floating-Point

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:
+1=0001
−1=1001

In two's complement representation, an n-bit integer i is represented by the low order n bits of the binary n+1-bit value $2^n+i$, so a 4-bit two's complement integer would represent plus and minus one as:
+1=0001
−1=1111

The two's complement format is practically universal for signed integers because it simplifies computer arithmetic.

A fixed-point number looks exactly like an integer, but actually represents a value that has a certain number of fractional bits. Sensor data is often in fixed-point format, and there is a great deal of fixed-point software that was written before the widespread adoption of FP. Fixed-point numbers are quite tedious to work with because a programmer has to keep track of the "binary point", i.e. the separator between the integer and fractional parts of the number, and also has to constantly shift the number to keep the bits in the correct place. FP numbers don't have this difficulty, so it is desirable to be able to convert between fixed-point numbers and FP numbers. Being able to do conversions also means that we can still use fixed-point software and data, but we are not limited to fixed-point when writing new software.

Rounding FP Numbers

Most FP operations are required by the IEEE-754 standard to be computed as if the operation were done with unbounded range and precision, and then rounded to fit into an FP number. If the computation exactly matches an FP number, then that value is always returned, but usually the computation results in a value that lies between two consecutive floating-point numbers. Rounding is the process of picking which of the two consecutive numbers should be returned.

There are a number of ways of rounding, called rounding modes; six of these are of interest to ARM. These six are:

| mode | | definition |
|---|---|---|
| RNE | round-to nearest, ties to even | pick the closest value, or if both values are equally close then pick the even value |
| RNA | round to nearest, ties | pick the closest value, or if both values are |

| mode | definition |
| --- | --- |
| | to away | equally close then pick the value farthest away from zero |
| RZ | round to zero | pick the value closest to zero |
| RP | round to plus infinity | pick the value closest to plus infinity |
| RM | round to minus infinity | pick the value closest to minus infinity |
| RX | round to odd | pick the odd value |

The definition doesn't tell us how to round in any practical way. One common implementation is to do the operation, look at the truncated value (i.e. the value that fits into the FP format) as well as all of the remaining bits, and then adjust the truncated value if certain conditions hold. These computations are all based on:

L—(least) the least significant bit of the truncated value
G—(guard) the next most significant bit (i.e. the first bit not included in the truncation)
S—(sticky) the logical OR of all remaining bits that are not part of the truncation Given these three values and the truncated value, we can always compute the correctly rounded value according to the following table:

| mode | change to the truncated value |
| --- | --- |
| RNE | increment if (L&G)|(G&S) |
| RNA | increment if G |
| RZ | none |
| RP | increment if positive & (G|S) |
| RM | increment if negative & (G|S) |
| RX | set L if G|S |

For example, consider multiplying two 4-bit significands, and then rounding to a 4-bit significand.
sig1=1011 (decimal 11)
sig2=0111 (decimal 7)
multiplying yields
sig1×sig2=1001_101 (decimal 77)
L Gss
The least significant bit of the truncated 4-bit result is labeled L, the next bit G, and S is the logical OR of the remaining bits labeled s (i.e. S=0|1=1). To round, we adjust our 4-bit result (1001) according to the rounding mode and the computation in the table above. So for instance in RNA rounding, G is set so we return 1001+1=1010. For RX rounding G|S is true so we set L to 1 (it's already 1, so in this case nothing changes) and return 1001.

FIG. 1 schematically illustrates a data processing system 2 including a processor core 4 coupled to a main memory 6 which stores program instructions to be executed and data values to be manipulated. A register bank 8 stores operand values for data processing operations to be performed. These operand values may include, for example, floating point operands which include a sign value, an exponent value and a fraction value. A load store unit 10 is responsible for transferring such operand values between the register bank 8 and the main memory 6.

A floating point unit 10 is coupled to a register bank 8 and performs floating point operations upon floating point operands stored within the register bank 8 to generate floating point result values. The floating point processing operations performed can take a wide variety of different forms, such as additions, subtractions (a particular form of addition), multiplications, multiply-accumulate operations, etc. At least some of these data processing operations include addition operations in which a first floating point operand is added to a second floating point operand. When such an addition is performed, the exponent values of the first floating point operand and the second floating point operand need to be taken into account such that the significand values (derived from the fraction values), can be appropriately aligned before an addition is performed. Furthermore, the exponent value of the result value needs to be taken into account in determining how rounding is performed upon the result value, e.g. to what position within the result significand will rounding be performed and what rounding values, if any, will be applied.

FIG. 2 schematically illustrates a portion of a floating point addition pipeline for adding a first floating point operand received at a first input 14 to a second floating point operand received at a second input 16. It will be seen from FIG. 2 that the second floating point operand has a larger bit width than the first floating point operand, such as is appropriate in the case of a multiple-accumulate operation, but may also be appropriate when adding floating point values of different precisions.

The circuitry of FIG. 2 is a pipeline for which the operation extends over three clock cycles as illustrated by the portions V1, V2 and V3. Registers at the boundaries of these portions serve to capture inputs to that portion and generate outputs to the following portion in synchronism with a controlling clock signal. The first pipeline stage V1 incorporates a near-path in the left hand side and a far-path in the right hand side. The near-path corresponds to processing operations and parameters which are useful when the first floating point operand and the second floating point operand have the same exponent value or exponent values which differs by one. The near-path operation correspond to situations in which the result significand value from the addition may have one or more leading zero values and accordingly will require additional normalization beyond that used in the far-path, where the alignment is based upon the alignment of the floating point operand having the largest exponent value.

More particularly, the near-path includes leading zero anticipation circuitry 18 which serves to determine the number of leading zeros within a result significant value of a sum of the first floating point operand and the second floating point operand. Such a leading zero anticipation operation is performed by examining the exponent values of the two input operands and a number of high order bits of the input significands. In order to speed up the determination of the number of leading zeros the leading zero anticipator 18 may determined in parallel four candidate values for the number of leading zeros based upon respective assumptions of the relative characteristics of the first floating point operand and the second floating point operand. When the particular characteristics of these operands have been determined at a later time, then a selection among the plurality of candidate values will be made to select as the number of leading zeros the candidate value for which the respective assumptions are correct. The four assumptions for which candidate values of the number of leading zeros are determined are:

the exponent value of the first operand is equal to the first exponent value of the second operand and the first significand value is larger than the second significand value;

the first exponent value is equal to the second exponent value and the second significand value is larger than the first significand value;

the first exponent value is 1 greater than the second exponent value; and the second exponent value is 1 greater than the first exponent value.

The near-path provides a result for the number of leading zeros to take help with additions which correspond to effective subtractions that result in one or more leading zero in the difference (e.g. 1.111-1.110, or 1.000-0.111).

The four candidate values for the number of leading zeros are supplied to mask generation circuitry 20 which serves to generate a plurality of mask seed values. A mask seed selector 22 serves to select one of these mask seed values when the assumptions used by the leading zero anticipator 18 have been resolved. A leading zero selector 24 similarly serves to generate a value corresponding to the number of leading zeros present when the assumptions have been resolved.

Registers 26 and 28 serve to store significand values which have been aligned with one another and which are then supplied as inputs to an adder 30 which adds the first significand value and the second significant value to be generate a non-normalized significand value which is output to a normalization shifter 32. The normalization shifter 32 serves to apply a left shift by a normalizing shift amount to generate a normalized significand value which is output to register 34. In parallel with the operation of the adder 30, a mask shifter 36 serves to receive the selected mask seed value output from the mask selector 22 and subject this to a right shift equal in magnitude to the left shift applied by the normalization shifter 32. Accordingly, the mask value output from the mask shifter 36 to the rounding input bit selection circuitry 38 includes a bit indicating the bit position(s) within the non-normalized significand value output from the adder 30 to which rounding is to be performed (there may be more than one bit position indicated depending upon the different types of rounding control being performed). The rounding input bit selection circuitry 38 serves to select, in dependence upon the one or more masks supplied to it, one or more rounding input bits from within the non-normalized significand value output from the adder 30 which are to serve as inputs to the further rounding process. These rounding input bits are supplied to rounding bit generation circuitry 40 which serves to generate, in dependence upon the one or more rounding input bits, one or more output rounding bits which are applied to round the normalized significand value which is out from the normalization shifter 32. These rounding output bits are applied in rounded result generation circuitry which forms the final stage of the pipeline illustrated in FIG. 2 namely stage V3.

In operation of the circuitry of FIG. 2, the rounding bit generation circuitry 40 and the normalization shifter 32 operate at least partially in parallel. This assists in making the operation of the pipeline illustrated in FIG. 2 quicker. The mask shifter 36 serves to shift the one or more masks supplied to it by a mask shift amount which is equal and opposite to the normalization shift amount so as to align the one or more shifted masks with the non-normalized significant value output from the adder 32. The normalizing shift amount is a left shift and the mask shift amount is a right shift with the magnitude of the mask shift amount being equal to the magnitude of the normalizing shift amount.

The first and/or second floating point operands can have a double-length significand. The adder is split into a near/far path design, with all of the split-path logic occurring in the first cycle (V1). In that cycle 4 near-path LZAs are done speculatively (before it is known which operand is larger, and even before it is known whether the exponents are identical or differ by 1), and 2 far-path shifts are done speculatively (before it is known which input is larger). Mask seeds are also speculatively constructed in V1 in order to reduce the time for mask generation in V2. This speculation allows use of a single 107-bit adder in V2 to cover both paths. The LZA value from V1 is used to create masks for rounding logic in V2 and also to normalize the 107-bit sum from the adder 30. Two coeval increments completes the rounding for the numeric result in V3, leaving more than half of the cycle available for forwarding.

The near path is for effective subtractions that may result in more than one leading zero in the difference (e.g. 1.111-1.110, or 1.000-0.111). There are 4 near-path cases:

(exponents equal, siga>sigb) subtraction is siga−(unshifted) sigb (expa=expb+1) subtraction is siga−(1-bit right shifted) sigb (exponents equal, sigb>siga) subtraction is sigb−(unshifted) siga (expb=expa+1) subtraction is sigb−(1-bit right shifted) siga For any of these cases the number of leading zeros can be determined using logic called a leading-zero anticipator (LZA). LZAs examine two numbers and predict how many leading zeros there will be in the difference of the two numbers. The difference is usually left shifted by the LZA amount in order to normalize it.

LZA logic is typically evaluated at the same time as the significand addition, with the normalization (left) shift coming after the addition. The present design needs the left shift amount earlier than usual in order to capture rounding information (L, G, and S values) before doing the normalization shift. (Note that early knowledge of the left shift amount is necessary because circuitry of FIG. 2 can have one longer input; near-path sums whose inputs and outputs have the same length require no rounding).

The left-shift amount can be different for each of the near-path cases. So which case should be picked? At most one of these cases is applicable to any given subtraction, but it takes a significant amount of logic and latency to determine which case that is. In order to get the left shift value in the desired time, the LZAs are speculatively computed for all 4 cases, then the appropriate case is chosen later.

While the 4 LZAs are being computed, selection logic is generated based on the exponents (whether they are equal or differ by exactly one, and if they differ which is larger), and comparison of the significands (picking the larger if the exponents are equal). This immediately reduces the 4 LZA results to 2 by comparing the lowest-order bit of each input exponent: if the two bits are the same then we can eliminate two of the LZA results, and if the two bits are different we can also eliminate two of the LZA results. The two LZAs can then be reduced to zero or one based on the exponent and significand comparisons.

The final left shift amount may also be smaller than the selected LZA value because left shifting reduces the result exponent, and a biased exponent cannot be reduced below zero. The two speculative LZA values are compared to their respective larger exponents to see if the left shift amount needs to be gated by the exponent value. All of these comparisons result in a 7-bit left-shift value lshift[6:0], consisting of either the selected LZA or else the corresponding larger exponent minus one.

The value lshift[6:0] will be used to normalize the 107-bit sum in V2. It is also used to find the rounding bits L, G, and S, which would have been in a fixed position for a normalized sum. A mask is constructed with a 1 at that fixed position and zeros elsewhere, then right shifting the mask by lshift[6:0] allows selection of those bits before the sum is normalized, i.e., directly after the addition has been completed and before the sum has been left shifted.

In order to speed up the mask generation, a partial "mask seed" mseed[3:0] is constructed in V1. This 4-bit value is based on the two low-order bits of lshift:

mseed[3:0]=1000 if lshift[1:0]==00
mseed[3:0]=0100 if lshift[1:0]==01
mseed[3:0]=0010 if lshift[1:0]==10
mseed[3:0]=0001 if lshift[1:0]==11

The mask seed gives a head start toward completing the final masks. It is not actually constructed based on lshift, but is created speculatively based on the LZA and exponent values, with the final selection mirroring the selection of lshift. The present example creates a 4-bit mseed, but based on timing mseed could 2-bits or 8-bits or even larger.

Any addition or subtraction that is not computed using the near path goes through the far path. In the far path, the larger and smaller operands are picked, and then the smaller signficand is right shifted so that the significands line up correctly, a process known as alignment shifting. For example, if the exponents differ by k, the smaller significand should be right shifted by k bit positions. Rather than wait to know which operand is larger, both significands are speculatively shifted while the exponent difference is determined.

If the two low-order exponent bits are not equal, then a speculative 1-bit right shift is performed on both significands. Two exponent differences are simultaneously computed. Since those differences are computed faster for the low-order bits, speculatively and progressively the two significands are shifted by 2, 4, and 8 bits according to the speculative differences. At the end of this process 4 values available: unshifted siga, siga speculatively shifted by the low-order 4 bits of the difference expb-expa, unshifted sigb, and sigb speculatively shifted by the low-order 4 bits of the difference expa-expb.

The upper 53 bits of the significands are also compared in order to know which number is larger if the exponents are equal. If both exponents and the upper 53 bits of the significand are equal, the longer operand opb is declared to be the larger. This is a safe assumption because in this case opb will always be greater than or equal to opa, and we have saved time because the smaller 53-bit compare is faster than the slightly more informative 106-bit compare.

At this point the comparison results is used to pick the larger (sigl) and smaller (sigs) significands:

If opa>opb, then sigl=unshifted siga, and sigs=speculatively shifted sigb

If opb>=opa, then sigl=unshifted sigb, and sigs=speculatively shifted siga

The remaining bits of the exponent difference are then used to complete the shifting of sigs. All shifted out bits are examined to see if they are nonzero, a partial computation of the sticky bit used for rounding. Note that for very large exponent differences, sigs will be completely shifted out, i.e., it will be zero.

If the operation being computed is an effective subtraction (commonly called an unlike-signed add, or USA), then ops are inverted. If the partial sticky bit is zero and if a USA is computed, then the carry-in bit cin is set to 1. This is done in order to complete the two's complement of sigs: −sigs=~sigs+1. The "+1" only propagates to the low-order bit of sigs when the partial sticky bit is zero.

In V2, the masks for rounding information L, G, S are created by right shifting the mask seed into place (using the value lshift[6:2]) at the same time as adding sigl and sigs.

Note that lshift=0 for any far-path operation. As soon as the sum has completed, it is left-shifted (normalized) by the lshift amount. Concurrently with the left shifting, the masks are applied to the unshifted sum in order to pick out the rounding L, G, and S (for both significand overflow and non-significand overflow cases); these bits are then used to create round and significand overflow round (ovfl round) bits.

In V3, two incrementers add the sum and each of the rounding bits. The non-overflow incrementer (labelled "inc") adds sum[53:0] and "round". If bit 54 of this sum is set, then the system is in the overflow2 case, and the final result fraction will be zeros. Otherwise, if bit 53 of this sum is set, then the system is in the overflow case, and we pick the "ovfl inc" result (bits 51:0 of the result of adding sum[53:1] and "ovfl round"). If both bits 53 and 54 are zero, then the result fraction comes from bits 51:0 of the "inc" incrementer.

Floating-point also deals with special values, such as not-a-number values and infinities. This logic is separate from what is shown here, and it overrides any of these computations. It is shown as "specials" in V3.

FIG. 3 is a flow diagram schematically illustrating the operation of the circuitry of FIG. 2. At step 42 processing waits until there is a floating point addition to be performed. Step 44 receives the first floating point operand and the second floating point operand. Step 46 uses the leading zero anticipator 18 to anticipate a number of leading zero values based upon four different assumptions as previously explained. Step 48 generates four mask seed values based upon the four different assumptions. Step 50 determines the correct assumption and identifies the correct number of leading zeros and the correct mask seed. Step 52 generates the masks required to pick out the rounding input bits from the non-normalized significand. Step 54 adds the first significand and the second significand to generate the non-normalized significand. Steps 56, 58 and 60 are performed at least partially in parallel.

Step 58 serves to select the rounding input bits from the non-normalized significand using the results of step 52. Step 60 generates the output rounding bits in dependence upon the rounding input bits which have been selected. Step 56 shifts the non-normalized significand to form the normalized significand. Finally, step 62 serves to round the normalized significand using the output rounding bits generated at step 60 in order to generate the result significand value.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

I claim:

1. Apparatus for processing data, comprising:
a first input to receive a first floating point operand having a first significand value;
a second input to receive a second floating point operand having a second significand value;
leading zero anticipation circuitry, coupled to said first input and said second input, to determine a number of leading zeros within a result significand value of a sum of said first floating point operand and said second floating point operand;

mask generation circuitry to generate, in dependence upon said number of leading zeros, one or more masks to be used to control rounding of said result significand value;

an adder to add said first significand value and said second significand value to generate a non-normalized significand value;

rounding input bit selection circuitry to select, in dependence upon said one or more masks, one or more rounding input bits within said non-normalized significand value;

a normalization shifter to shift said non-normalized significand value by a normalizing shift amount to form a normalized significand value; and rounding bit generation circuitry to generate, in dependence upon said one or more rounding input bits, one or more output rounding bits to be applied to round said normalized significand value to form said result significand value.

2. Apparatus as claimed in claim 1, wherein said rounding bit generation circuitry and said normalization shifter operate at least partially in parallel.

3. Apparatus as claimed in claim 1, comprising a mask shifter to shift said one or more masks by a mask shift amount dependent upon said normalizing shift amount to align said one or more masks with said non-normalized significand value.

4. Apparatus as claimed in claim 3, wherein said normalizing shift amount is a left shift, said mask shift amount is a right shift, and a magnitude of said mask shift amount to equal a magnitude of said normalizing shift amount.

5. Apparatus as claimed in claim 1, comprising rounded result generation circuitry to generate said result significand value in dependence upon said one or more output round bits and said normalized significand value.

6. Apparatus as claimed in claim 1, wherein said leading zero anticipation circuitry determines a plurality of candidate values for said number of leading zeros based upon respective assumptions of relative characteristics of said first floating point operand and said second floating point operand and selects a value of said number of leading zeros from among said plurality of candidate values in dependence upon a determination of which one of said respective assumptions is correct.

7. Apparatus as claimed in claim 6, wherein said first floating point operand includes a first exponent value, said second floating point operand includes a second exponent value, and said respective assumptions include one or more of:

said first exponent value is equal to said second exponent value and said first significand value is larger than a second significand value;

said first exponent value is equal to said second exponent value and said second significand value is larger than said first significand value;

said first exponent value is one greater than said second exponent value; and said second exponent value is one greater than said first exponent value.

8. Apparatus as claimed in claim 6, wherein said mask generation circuitry at least partially generates one or more mask values for each of said plurality of candidate values.

9. Apparatus as claimed in claim 8, wherein said mask generation circuitry generates a mask seed value for each of said plurality of candidate values and selects therefrom a selected mask seed value representing said number of leading zeros based upon said determination of which one of said respective assumptions is correct.

10. Apparatus as claimed in claim 9, wherein said mask generation circuitry generates, in dependence upon said selected mask seed value, said one or more masks to be used to control rounding of said result significand value.

11. Apparatus for processing data, comprising:

first input means for receiving a first floating point operand having a first significand value;

second input means for receiving a second floating point operand having a second significand value;

leading zero anticipation means, coupled to said first input means and said second input means, for determining a number of leading zeros within a result significand value of a sum of said first floating point operand and said second floating point operand;

mask generation means for generating, in dependence upon said number of leading zeros, one or more masks to be used to control rounding of said result significand value;

adder means for adding said first significand value and said second significand value to generate a non-normalized significand value;

rounding input bit selection means for selecting, in dependence upon said one or more masks, one or more rounding input bits within said non-normalized significand value;

normalization shifting means for shifting said non-normalized significand value by a normalizing shift amount to form a normalized significand value; and rounding bit generation means for generating, in dependence upon said one or more rounding input bits, one or more output rounding bits to be applied to round said normalized significand value to form said result significand value.

12. A method of processing data, comprising:

receiving, at a first input, a first floating point operand having a first significand value;

receiving, at a second input, a second floating point operand having a second significand value;

determining, by leading zero anticipation circuitry, a number of leading zeros within a result significand value of a sum of said received first floating point operand and said received second floating point operand;

mask generation circuitry generating, in dependence upon said number of leading zeros, one or more masks to be used to control rounding of said result significand value;

an adder adding said first significand value and said second significand value to generate a non-normalized significand value;

rounding input bit selection circuitry selecting, in dependence upon said one or more masks, one or more rounding input bits within said non-normalized significand value;

shifting, by a normalization shifter, said non-normalized significand value by a normalizing shift amount to form a normalized significand value; and rounding bit generation circuitry generating, in dependence upon said one or more rounding input bits, one or more output rounding bits to be applied to round said normalized significand value to form said result significand value.

* * * * *